No. 736,122. PATENTED AUG. 11, 1903.
T. W. LOARING.
CHANGEABLE SIGN.
APPLICATION FILED MAY 4, 1903.
NO MODEL.
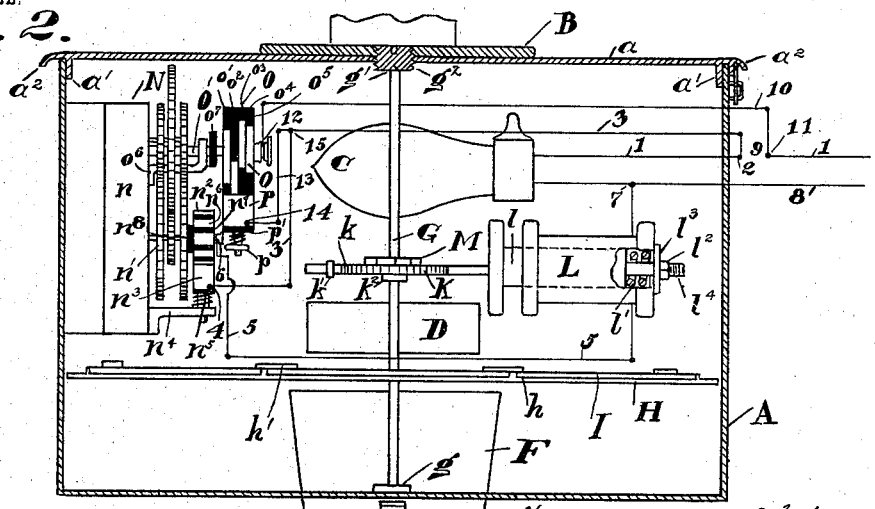
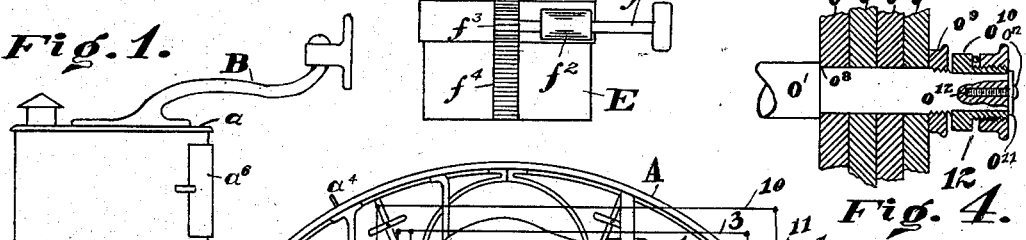
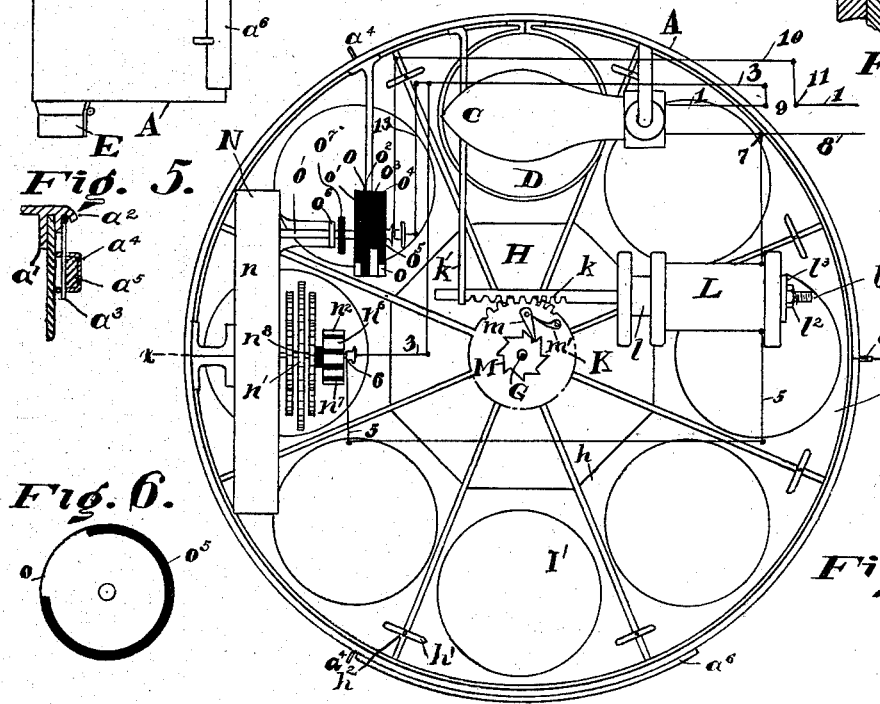
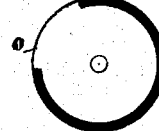
Witnesses.
Henry N. Bauer.
Herbert F. Harden.
Inventor:
Thomas W. Loaring,
by his Attorney.

No. 736,122. Patented August 11, 1903.

UNITED STATES PATENT OFFICE.

THOMAS W. LOARING, OF CINCINNATI, OHIO, ASSIGNOR OF ELEVEN-FIFTEENTHS TO WALTER J. FRIEDLANDER, OF CINCINNATI, OHIO.

CHANGEABLE SIGN.

SPECIFICATION forming part of Letters Patent No. 736,122, dated August 11, 1903.

Application filed May 4, 1903. Serial No. 155,584. (No model.)

*To all whom it may concern:*

Be it known that I, THOMAS W. LOARING, a citizen of the United States, residing at Cincinnati, in the county of Hamilton and State of Ohio, have invented certain new and useful Improvements in Changeable Signs, of which the following is a specification.

My invention relates to changeable signs, and has for its object the providing of a machine from which the signs are projected by means of an optical or magic lantern and in which the signs or slides are successively brought into line with the optical lantern, the providing of novel means for automatically advancing the slides, and novel means for automatically bringing the advancing mechanism into operative or inoperative relation at predetermined times, and the invention will be readily understood from the following description and claims and from the drawings, in which latter—

Figure 1 represents a side elevation of my improved device. Fig. 2 is a side elevation of my improved device with the case thereof in section on the line $x\ x$ of Fig. 3. Fig. 3 is a plan view of my improved device with the lid of the case removed. Fig. 4 is a sectional detail showing the electric-conductor connection for the circuit-maker in the main circuit. Fig. 5 is a detail of the clasps between the box and cover, and Fig. 6 is a side view of one of the disks in the main circuit.

A represents the case, B a bracket by which it may be supported from a wall, post, or other attaching place. The box has a lid $a$, to which the bracket may be directly connected, the lid having an inner flange $a'$, a protecting flange $a^2$, taking above the sides of the box, the box proper being secured to the lid by means of hasps $a^3$, placed at suitable points about the periphery of the box, the hasps taking over staples $a^4$, pins $a^5$ preventing retraction of the hasps.

C is the lamp of the optical lantern.

D is the condenser, E the focusing-slide containing the objective lens, the slide telescoping into a tube F and operated by means of a thumb-shaft $f'$, journaled in a bearing $f^2$ of the tube and having a pinion $f^3$, meshing in a rack $f^4$ on the slide.

G is a shaft supported by bearings $g\ g'$. These bearings are shown as step-bearings, one of them on a bolt $g^2$ for adjustment. The shaft carries a disk H, having suitable seats $h$ for transparencies or slides I, the sights of which are shown at I'. The slides are placed in the seats $h$, retaining-clips $h'$, pivoted on pins $h^2$, being adapted to hold the slides is place. The shaft also carries a gear K, which may be a segment and which is meshed by a rack $k$, secured to the plunger $l$ of a magnet L. I have shown this magnet as a solenoid, the plunger thereof being normally yieldingly held outwardly by a spring $l'$ with a nut $l^2$, taking against a washer $l^3$, normally limiting outward movement of the plunger. The nut is threaded on an extension $l^4$ of the plunger, adjustably limiting such outward movement. The free end of the rack may be supported by a bracket $k'$, projecting from the wall of the box. The gear K is loosely mounted about the shaft G, resting on a collar $k^2$, secured to the shaft. A ratchet-wheel M is secured to the shaft, a ratchet $m$ being pivoted to the gear K and engaging the teeth of the ratchet-wheel, a spring $m'$ pressing the ratchet toward said teeth. When the ratchet-wheel is actuated, it advances the shaft, thereby advancing the disk H, according to the movement imparted by the magnet. I have shown the disk provided with eight slides, the ratchet-wheel being provided with eight teeth and the magnet arranged to advance the ratchet-wheel one tooth at each action of the magnet, thereby successively causing the several slides to be brought into line with the optical lantern.

For controlling the action of the magnet I have provided a motor N. This motor I have shown in the form of a clock, in which $n$ is the clock-case, from which gearing $n'$ is actuated for turning a contact-maker $n^2$ at a given speed. A brush $n^3$, suitably supported from the motor-case by a bracket $n^4$ and insulated support $n^5$, contacts with the contact-maker. The contact-maker has electric contact-parts $n^6$, separated by insulated parts $n^7$, for alternately making and breaking electric connection between the contact-maker, or as it may also be termed, "contact-breaker," and brush.

The wire 1 of the lamp is tapped at 2 by a wire 3, which is connected with the brush at 4. A wire 5 connects with the shaft of the contact-maker at 6 and passes through the solenoid and connects at 7 with the opposite wire 8 of the lamp. As the contact-maker is turned by the motor electric energy is conveyed to and broken from the magnet, the rack $k$ being actuated at each electric connection for turning the shaft and disk the distance of one slide, the rack being retracted to normal position at each break of electric contact, ready to again move the disk when the next electric connection is made. These intermittent movements of the slide may be at short or longer intervals, dependent on the arrangement of the electric connection or speed of the contact-breaker shaft. I prefer that the intervals shall be short—say about ten to thirty seconds—and that the retraction of the rack shall be almost instantaneous.

In order to automatically throw the disk-operating mechanism into operation throughout predetermined times of the day or night, I have provided a contact-maker O. A shaft O' is geared with the motor or clock mechanism in such manner as to make, preferably, one revolution each twenty-four hours. The shaft O carries a plurality of disks, as $o'$ $o^2$ $o^3$ $o^4$, each of which has an electric-contact part $o$ and an insulated part $o^5$, the electric-contact part preferably being at the periphery of the disk. The shaft O may have a bearing in a bracket $o^6$. A brush P takes against the disks. The brush may be supported on a bracket $p$ and insulated support $p'$. Electric contact is made through the disk and brush throughout the time that the parts $o$ are in contact with the brush. These contact parts $o$ extend only part way around the periphery of the respective disks, and the disks are arranged to be adjusted about their axis on the shaft, so that all the contact parts $o$ on all the disks may be placed in line to make the shortest connection through the brush, or they may lap each other or be placed in advance of each other to make longer or continual contact with the brush. For electrically connecting this latter mechanism I break the wire 1 at 9 and connect a wire 10 to it at 11 and connect the wire 10 with the disks, as at 12. A wire 13 connects with the brush P at 14 and with wire 3 at 15. The wires 3, 10, and 13 therefore form a loop in the wire 1, which loop may be termed the "main circuit," the current flowing through the branch circuit in which the magnet is located only when the electric contact parts on the disks are in contact with the brush P. In this manner an eight-day clock, for instance, may be used in my improved device, and the device will throw signs, transparencies, or pictures automatically throughout predetermined hours of each day and automatically make slide changes throughout the predetermined hours of the day. It is of course understood that proper insulation may be placed between the contact parts $o$ and the mechanism of the motor, as shown at $o^7$, and between the contact-breaker $n^2$ and motor mechanism, as shown at $n^8$. The box may also be provided with a door $a^6$, through which attention may be given the interior of the box and the slides changed. It is of course obvious that other electric conductors may be employed in place of wire.

The shaft O' has a shoulder $o^8$, between which and a nut $o^9$ the disks $o'$ $o^2$ $o^3$ $o^4$ may be clamped. The connection 12 between the electric conductors and the disks may comprise a sleeve $o^{10}$, in which the shaft O' may revolve and to which sleeve the electric conductor is secured, the sleeve being held on the shaft by a washer $o^{11}$ and screw $o^{12}$. The connection 6 may be similarly made.

Having thus fully described my invention, what I claim as new, and desire to secure by Letters Patent, is—

1. In a changeable-sign apparatus, the combination with the case and optical lantern, of an electric lamp for the lantern, electric conductors forming an electric circuit supplying electric energy to said lamp, a part having thereon a plurality of signs, an electric magnet energized from said electric lamp conductors and means connected therewith arranged to advance the signs into line with the optical lantern, a motor, and means interposed in said electric conductors and driven by said motor for alternately making and breaking contact in said electric circuit.

2. In a changeable-sign apparatus, the combination with the case, of an electric lamp, electric conductors therefor conducting electric energy to said lamp, a plate having a plurality of signs thereon, a magnet and means connected therewith arranged to rotate the plate, an electric connection between the lamp and magnet, energizing said magnet from said electric-lamp conductors, a motor, and means interposed in said electric connection and driven by said motor for alternately making and breaking said electric connection.

3. In a changeable-sign apparatus, the combination of means for projecting transparencies, said means including an electric light and electric conductors therefor, with a pair of circuit-makers, a magnet and means actuated thereby arranged to advance the transparencies, an electric connection with each circuit-maker receiving electric energy from said electric-light conductors, the electric connection with one of said circuit-makers passing through the other circuit-maker, and means actuating the circuit-makers.

4. In a changeable-sign apparatus, the combination with the case and optical lantern, of an electric lamp for the optical lantern, an electric circuit supplying electric energy thereto, a plate having a plurality of signs thereon, an electric magnet and means connected therewith arranged to rotate the plate, a second electric circuit connecting with and receiving electric energy from said first-named electric circuit and imparting electric energy to said magnet, a motor, and means interposed in said second electric circuit and driven by said motor for alternately making and breaking said second-named circuit.

5. In an automatic changeable-sign apparatus, the combination with an optical lantern and electric lamp therefor, of a sign-disk arranged for receiving a plurality of signs, electric conductors for said electric lamp forming a main electric circuit passing through said lamp, throughout the time said lamp is lighted, an automatic circuit-maker in said main circuit and means for operating the same, means comprising a magnet and connection therefrom for automatically advancing and resting said sign-disk, a second circuit-maker, means for operating the latter, and a branch circuit passing through said magnet and connecting with said main circuit and receiving electric energy from said main circuit, said automatic circuit-maker in said main circuit intermittently causing electric energy to pass through said lamp and branch circuit.

6. In an automatic changeable-sign apparatus, the combination of a case, an optical lantern at one side thereof, a disk, signs thereon, an electric lamp for the optical lantern, a pair of electric conductors therefor, conductors for forming a circuit connecting therewith, a circuit-maker including a pair of electric connections in said circuit, means for operating the circuit-maker and causing relative movement of said connections once in twenty-four hours and causing comparatively long-continued closing of said circuit during said time, a magnet, a connection between said magnet and said disk arranged for successively advancing the signs on said disk into range with said optical lantern, electric conductors for the magnet electrically connecting with the circuit in which said circuit-maker is located and forming a circuit in which said magnet is located, a circuit-maker in said last-named circuit, and means operating the circuit-maker for causing electric energy to pass through said magnet at short intervals while said first-named circuit is closed.

7. In an automatic changeable-sign apparatus, the combination of a case, an optical lantern at one side thereof, a disk, signs thereon, an electric lamp for the optical lantern, a pair of electric conductors therefor, conductors for forming a circuit connecting therewith, a circuit-maker including a pair of electric connections in said circuit, means regulating the length of contact between said connections, means for operating the circuit-maker and causing relative movement of said connections once in twenty-four hours and causing comparatively long-continued closing of said circuit during said time, a magnet, a connection between said magnet and said disk arranged for successively advancing the signs on said disk into range with said optical lantern, electric conductors for the magnet electrically connecting with the circuit in which said circuit-maker is located and forming a circuit in which said magnet is located, a circuit-maker in said last-named circuit, and means operating the circuit-maker for causing electric energy to pass through said magnet at short intervals while said first-named circuit is closed.

8. In a display apparatus, the combination, with a part having a plurality of pictures or signs thereon, a solenoid, a connection between the latter and said part for intermittently advancing said part, an electric light, a pair of electric conductors conveying electric energy to said electric light and forming a circuit to said light, an electric connection with the solenoid from said circuit, and a power-driven contact-maker in said latter connection for causing intermittent energizing of said solenoid.

In witness whereof I have signed my name hereto in the presence of two subscribing witnesses.

THOMAS W. LOARING.

Witnesses:
 HERBERT F. HARDEN,
 HENRY N. BAUER.